US009148263B2

(12) United States Patent
Seo et al.

(10) Patent No.: US 9,148,263 B2
(45) Date of Patent: Sep. 29, 2015

(54) METHOD AND APPARATUS FOR TRANSMITTING RECEPTION ACKNOWLEDGEMENT INFORMATION IN WIRELESS COMMUNICATION SYSTEM

(71) Applicant: LG ELECTRONICS INC., Seoul (KR)

(72) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/336,900

(22) Filed: Jul. 21, 2014

(65) Prior Publication Data

US 2014/0328293 A1    Nov. 6, 2014

Related U.S. Application Data

(63) Continuation of application No. 13/504,075, filed as application No. PCT/KR2010/007343 on Oct. 25, 2010, now Pat. No. 8,804,812.

(60) Provisional application No. 61/255,077, filed on Oct. 26, 2009, provisional application No. 61/317,705, filed on Mar. 26, 2010, provisional application No. 61/329,075, filed on Apr. 28, 2010.

(51) Int. Cl.
*H04L 1/18* (2006.01)
*H04L 5/00* (2006.01)
*H04L 1/00* (2006.01)

(52) U.S. Cl.
CPC ............ *H04L 1/1861* (2013.01); *H04L 5/0055* (2013.01); *H04L 1/0007* (2013.01); *H04L 5/0007* (2013.01); *H04L 5/0091* (2013.01)

(58) Field of Classification Search
CPC combination set(s) only.
See application file for complete search history.

(56) References Cited

U.S. PATENT DOCUMENTS 8,009,782 B2 * 8/2011 Baumgartner et al. ....... 375/351
8,477,811 B2 * 7/2013 Kitazoe ......................... 370/503
(Continued)

FOREIGN PATENT DOCUMENTS

CN    101361309 A    2/2009
CN    101465720 A    6/2009
(Continued)

OTHER PUBLICATIONS

3GPP "3rd Generation Partnership Project; Technical Specification Group Radio Access Network; Evolved Universal Terrestrial Radio Access (E-UTRA); Physical Channels and Modulation (Release8)," 3GPP TS 36.211, v8 7.0, May 2009, 9 PAGES (pp. 2-3, 16-20).

(Continued)

*Primary Examiner* — Fan Ng
(74) *Attorney, Agent, or Firm* — Birch, Stewart, Kolasch & Birch, LLP

(57) ABSTRACT

A method for configuring an acknowledgement for a hybrid automatic repeat request (HARQ) in a wireless communication system. The method includes receiving downlink data through one of a first downlink component carrier and a second downlink component carrier from a base station; and determining whether the first or second downlink component carrier is used for receiving the downlink data. If the first downlink component carrier is used for receiving the downlink data, the resource used for the PUCCH is determined by using a control channel element (CCE). If the second downlink component carrier is used for receiving the downlink data, the resource used for the PUCCH is determined by using a radio resource control (RRC) message. The resource used for the PUCCH is associated with an orthogonal sequence with which the ACK/NACK signal is spread.

10 Claims, 17 Drawing Sheets

(56) References Cited

U.S. PATENT DOCUMENTS

| | | | |
|---|---|---|---|
| 8,582,638 B2 * | 11/2013 | Earnshaw et al. | 375/240 |
| 8,908,596 B2 * | 12/2014 | Han et al. | 370/328 |
| 2007/0113147 A1 | 5/2007 | Hong et al. | |
| 2011/0051681 A1 * | 3/2011 | Ahn et al. | 370/330 |
| 2011/0194499 A1 * | 8/2011 | Aiba et al. | 370/328 |
| 2011/0194501 A1 * | 8/2011 | Chung et al. | 370/328 |
| 2011/0194514 A1 * | 8/2011 | Lee et al. | 370/329 |
| 2011/0205996 A1 * | 8/2011 | Kim et al. | 370/329 |
| 2011/0267957 A1 * | 11/2011 | Du et al. | 370/241 |
| 2012/0178360 A1 * | 7/2012 | Park et al. | 455/7 |
| 2012/0207123 A1 * | 8/2012 | Seo et al. | 370/329 |
| 2013/0242923 A1 * | 9/2013 | Yang et al. | 370/329 |
| 2014/0226581 A1 * | 8/2014 | Nam et al. | 370/329 |

FOREIGN PATENT DOCUMENTS

| | | |
|---|---|---|
| GB | 2 457 852 A | 9/2009 |
| KR | 10-2008-0065880 A | 7/2008 |
| WO | WO 2007/078051 A2 | 7/2007 |
| WO | WO 2009/119818 A1 | 10/2009 |

OTHER PUBLICATIONS

Catt, "ULACK/NACK transmission scheme for LTE-A," 3GPP TSG RAN WG1 meeting #57bis, R1-092789, Los Angeles, CA, USA, Jun. 29-Jul. 3, 2009, 3 pages.

Ericsson, "Physical-layer-related parameters to be configured by RRC," TSG-RAN WG1 #49bis, R1-073221, Orlando, Florida, US, Jun. 25-29, 2007, 3 pages.

LG Electronics, "ACK/NACK PUCCH for LTE-Advanced", 3GPP TSG-RAN WG1 #57bis, R1-092501, Jun. 29-Jul. 3, 2009, Los Angeles, CA, USA.

Motorola, "Control Signalling Design for Supporting Carrier Aggregation," 3GPP TSG RAN1#56, R1-090792, Athens, Greece, Feb. 9-13, 2009, 8 pages.

Nokia Siemens Networks Nokia, R1-092558, "CSI payload extension using PUCCH and periodic PUSCH", 3GPP TSG-RAN WG1 #57bis, Jun. 29-Jul. 3, 2009, Los Angeles, CA, 2009.

Panasonic, "PUCCH resource allocation schemes for carrier aggregation," 3GPP TSG RAN WG1 Meeting #58bis, R1-093943, Miyazaki, Japan, Oct. 12-16, 2009, pp. 1-2.

Panasonic, R1-091744, "ULAKC/NACK transmission on PUCCH for carrier aggregation", 3GPP TSG-RAN WG1 Meeting #57, May 4-8, 2009, San Francisco, USA.

Qualcomm Europe, "UL HARQ Feedback for Multicarrier Operation," 3GPP TSG RAN WG1 #57bis, R1-092709, Jun. 29-Jul. 3, 2009, Los Angeles, USA, pp. 1-4.

Texas Instruments, "Downlink and Uplink Control to Support Carrier Aggregation," 3GPP TSG RAN WG1 #57, R1-091838, San Francisco, USA, May 4-8, 2009, pp. 1-5.

Texas Instruments, "Dynamic ACK/NAK Channelization on PUCCH," 3GPP TSG RAN WG1 #52bis, R1-081375, Shenzhen, China, Mar. 31-Apr. 4, 2008, pp. 1-4.

Zte, "ACK/NACK Design for LTE-Advanced," TSG-RAN WG1 #58, R1-093208, Shenzhen, China; Jun. 25-Aug. 29, 2009, pp. 1-9.

* cited by examiner

METHOD AND APPARATUS FOR TRANSMITTING RECEPTION ACKNOWLEDGEMENT INFORMATION IN WIRELESS COMMUNICATION SYSTEM

CROSS-REFERENCE TO RELATED APPLICATIONS

This application is a continuation of co-pending U.S. patent application Ser. No. 13/504,075 filed Apr. 25, 2012, which is the national phase of PCT International Application No. PCT/KR2010/007343 filed on Oct. 25, 2010, which claims the benefit of U.S. Provisional Application Nos. 61/255,077 filed on Oct. 26, 2009, 61/317,705 filed on Mar. 26, 2010, and 61/329,075 filed on Apr. 28, 2010. The entire contents of all of the above applications are hereby incorporated by reference into the present application.

BACKGROUND OF THE INVENTION

1. Field of the Invention

The present invention relates to wireless communications, and more particular, to a method and apparatus for transmitting a reception acknowledgment for hybrid automatic repeat request (HARQ) in a wireless communication system.

2. Discussion of the Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is distinguished by using different codes, frequencies, times, or combinations thereof while using the same time-frequency resources. Code division multiplexing (CDM) uses different codes. Frequency division multiplexing (FDM) uses different frequencies. That is, each of user equipments transmits its PUCCH by using different codes and/or frequencies in the same time resource.

Meanwhile, a single-carrier system generally considers only one carrier even if a different bandwidth is set between an uplink and a downlink. The carrier is defined with a center frequency and a bandwidth. A multiple-carrier system uses a plurality of component carriers (CCs) having a narrower bandwidth than a full bandwidth.

The multiple-carrier system can support backward compatibility with respect to legacy systems, and can significantly increase a data rate by using multiple carriers.

The 3GPP LTE system is a single-carrier system supporting only one bandwidth (i.e., one CC) among {1.4, 3, 5, 10, 15, 20} MHz. On the other hand, an LTE-advanced (LTE-A) which is an evolution of 3GPP LTE employs multiple carriers.

In the single-carrier system, a control channel and a data channel are designed on the basis of a single carrier. However, it may be ineffective if the channel structure of the single-carrier system is also used in the multi-carrier system without alteration.

SUMMARY OF THE INVENTION

The present invention provides a method and apparatus for transmitting a reception acknowledgement for hybrid automatic repeat request (HARQ) in a wireless communication system.

In an aspect, a method for transmitting a reception acknowledgement for hybrid automatic repeat request (HARQ) of a user equipment in a wireless communication system is provided. The method includes receiving a downlink resource allocation through at least one downlink carrier among a plurality of downlink carriers, receiving a downlink transport block on a downlink shared channel indicated by the downlink resource allocation, and transmitting a positive-acknowledgement (ACK)/negative-acknowledgement (NACK) signal for the downlink transport block on an uplink control channel. If the at least one downlink carrier is a primary carrier, the uplink control channel uses a first resource, and if the at least one downlink carrier is not the primary carrier, the uplink control channel uses a second resource.

In another aspect, a user equipment for transmitting a reception acknowledgement for hybrid automatic repeat request (HARQ) in a wireless communication system is provided. The user equipment includes a radio frequency (RF) unit for transmitting and receiving a radio signal, and a processor operably coupled to the RF unit and configured for receiving a downlink resource allocation through at least one downlink carrier among a plurality of downlink carriers, receiving a downlink transport block on a downlink shared channel indicated by the downlink resource allocation, and transmitting a positive-acknowledgement (ACK)/negative-acknowledgement (NACK) signal for the downlink transport block on an uplink control channel. If the at least one downlink carrier is a primary carrier, the uplink control channel uses a first resource, and if the at least one downlink carrier is not the primary carrier, the uplink control channel uses a second resource.

A positive-acknowledgement (ACK)/negative-acknowledgement (NACK) signal of a greater payload can be transmitted, and detection performance of the ACK/NACK signal can be improved.

DETAILED DESCRIPTION OF THE INVENTION

Figure 1:
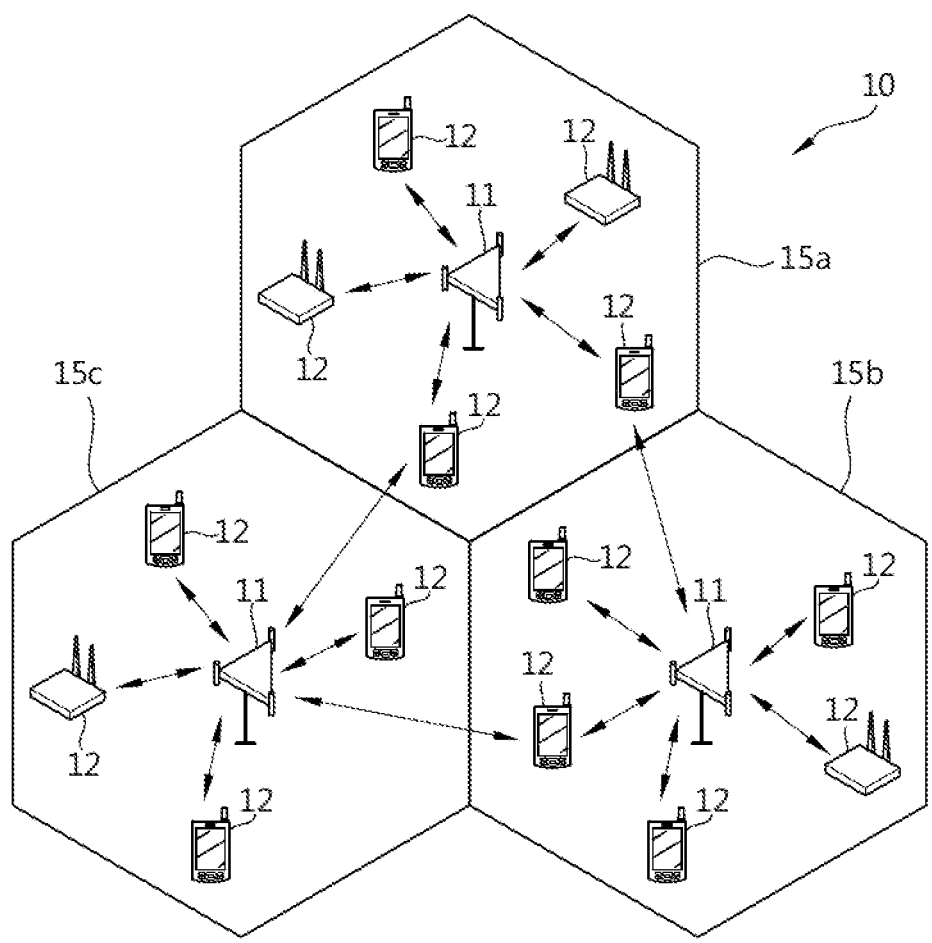
FIG. 1 is a diagram showing a wireless communication system.

FIG. 1 is a diagram showing a wireless communication system.

A wireless communication system 10 includes one or more base stations (BSs) 11. Each of the BSs 11 provides communication services to a specific geographical area (in general referred to as a cell) 15a, 15b, or 15c. Each of the cells can be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, downlink (DL) implies communication from the BS to the UE, and uplink (UL) implies communication from the UE to the BS. In DL, a transmitter may be a part of the BS, and a receiver may be a part of the MS. In UL, the transmitter may be a part of the UE, and the receiver may be a part of the BS.

Figure 2:
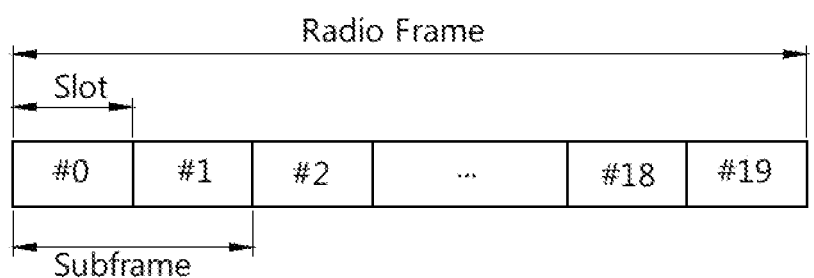
FIG. 2 is a diagram showing a structure of a radio frame in $3^{rd}$ generation partnership project (3GPP) long term evolution (LTE).

FIG. 2 is a diagram showing the structure of a radio frame in the 3GPP LTE. The section 6 of 3GPP TS 36.211 V8.7.0 (2009-05) "Evolved Universal Terrestrial Radio Access (E-UTRA); Physical Channels and Modulation (Release 8)" may be incorporated herein by reference.

Referring to FIG. 2, a radio frame includes 10 subframes and one subframe consists of 2 slots. One subframe may have a length of 1 millisecond (ms), and one slot may have a length of 0.5 ms. A time required for transmitting one subframe is defined as a transmission time interval (TTI). A TTI is a basic for scheduling.

One slot may include a plurality of orthogonal frequency division multiplexing (OFDM) symbols in a time domain. OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

The structure of the radio frame is for exemplary purposes only, and thus the number of subframes included in the radio frame or the number of slots included in the subframe, and the number of OFDM symbols included in the slot may change variously.

Figure 3:
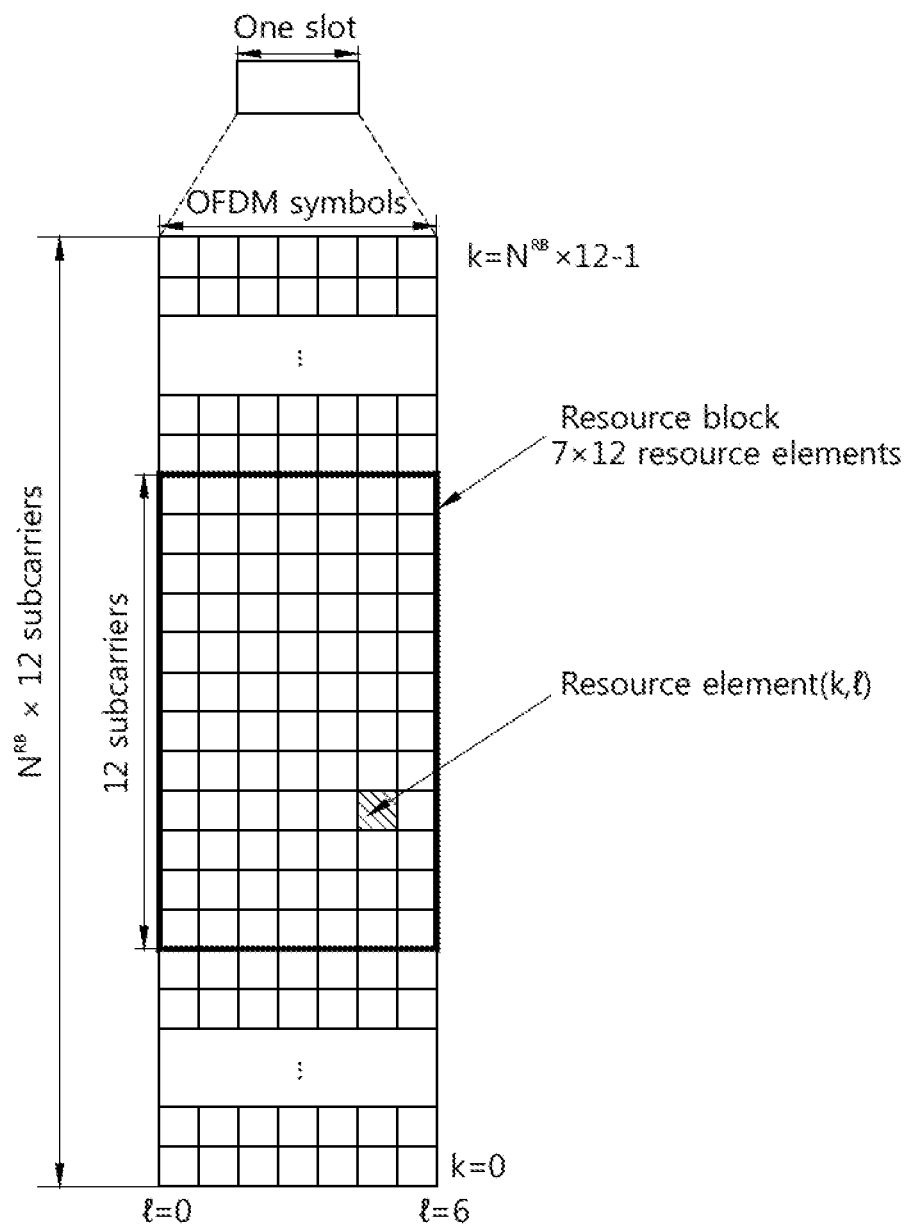
FIG. 3 shows an example of a resource grid for one slot.

FIG. 3 shows an example of a resource grid for one slot.

A slot in a subframe includes a plurality of OFDM symbols in time domain and a plurality of resource blocks (RBs) in frequency domain.

A RB is a resource allocation unit, and includes a plurality of subcarriers in one slot.

For example, if one slot includes 7 OFDM symbols in a time domain and an RB includes 12 subcarriers in a frequency domain, one RB can include 84 resource elements (REs).

The number $N^{RB}$ of RBs depends on system bandwidth or bandwidth of a component carrier.

Figure 4:
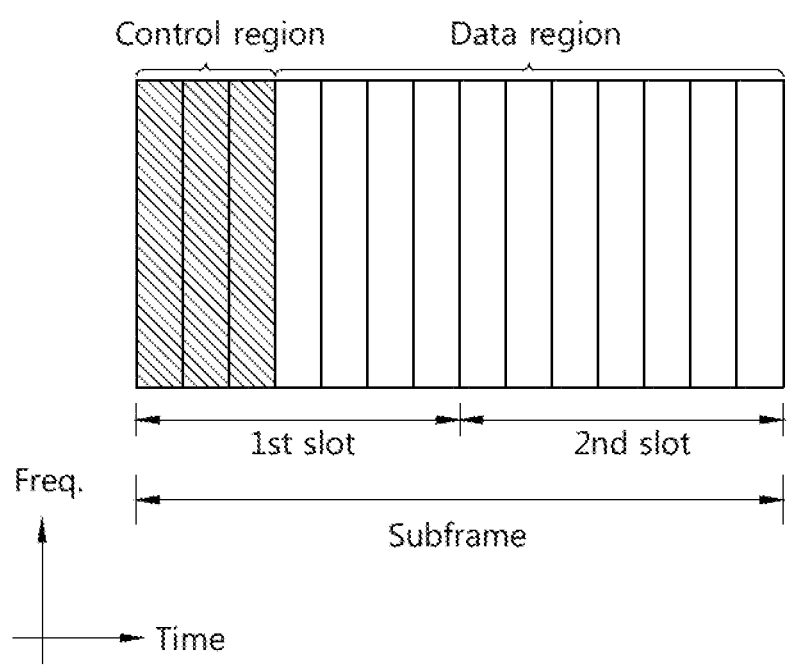
FIG. 4 is a diagram showing a structure of a downlink (DL) subframe in 3GPP LTE.

FIG. 4 is a diagram showing the structure of a DL subframe in the 3GPP LTE.

A DL subframe is divided into a control region and a data region in time domain. The control region includes up to three preceding OFDM symbols of a 1st slot in the subframe. The number of OFDM symbols included in the control region may vary. A PDCCH is allocated to the control region, and a PDSCH is allocated to the data region.

As disclosed in 3GPP TS 36.211 V8.7.0, the 3GPP LTE classifies physical channels into a data channel, i.e., a physical downlink shared channel (PDSCH) and a physical uplink shared channel (PUSCH), and a control channel, i.e., physical downlink control channel (PDCCH), physical control format indicator channel (PCFICH), physical hybrid-ARQ indicator channel (PHICH) and physical uplink control channel (PUCCH).

The PCFICH transmitted in the first OFDM symbol of the subframe carries a control format indicator (CFI) indicating the number of OFDM symbols (i.e., a size of the control region) used in transmission of control channels in the subframe. A UE first receives the CFI over the PCFICH, and thereafter monitors the PDCCH.

The PHICH carries a positive-acknowledgement (ACK)/negative-acknowledgement (NACK) signal for hybrid automatic repeat request (HARQ). The ACK/NACK signal for a UL transport block on the PUSCH transmitted by the UE is transmitted on the PHICH.

Control information transmitted through the PDCCH is referred to as downlink control information (DCI). The DCI may include a PDSCH resource allocation (referred to as a DL grant), a PUSCH resource allocation (referred to as a UL grant), a set of transmit power control commands for individual UEs in any UE group, and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having a DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined.

Figure 5:
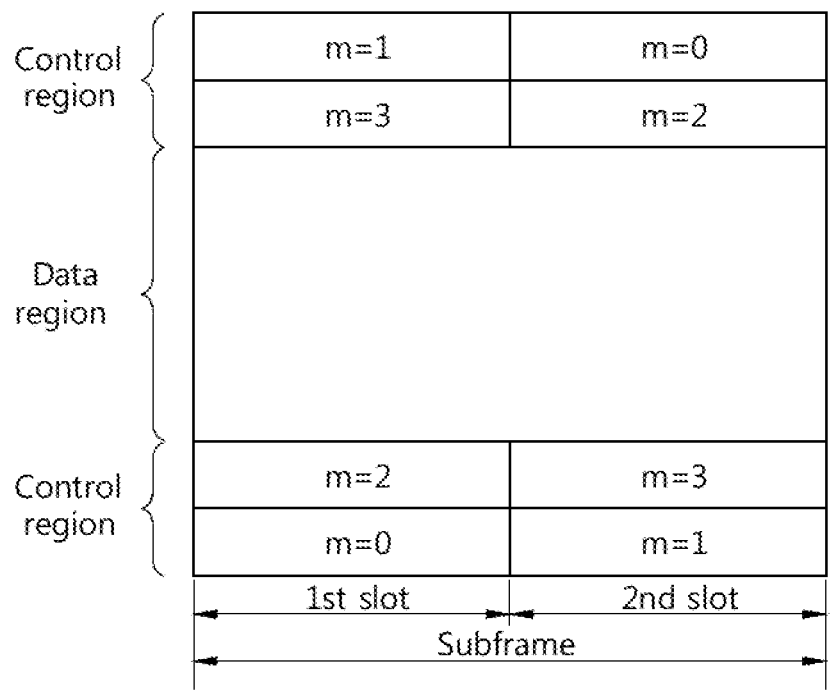
FIG. 5 is a diagram showing an example of an uplink (UL) subframe in 3GPP LTE.

FIG. 5 is a diagram showing an example of a UL subframe in the 3GPP LTE.

Referring to FIG. 5, The UL subframe can be divided into a control region to which a physical uplink control channel (PUCCH) carrying uplink control information is allocated and a data region to which a physical uplink shared channel (PUSCH) carrying uplink data is allocated.

A PUCCH for a UE is allocated in a pair of resource blocks in a subframe. Resources blocks belonging to the resource block-pair occupy different subcarriers in a first slot and a second slot. In FIG. 5, m is a position index indicating a logical frequency region position of the resource block pair, allocated to PUCCHs within the uplink subframe. FIG. 5 shows that resource blocks having the same m value occupy different subcarriers in the two slots.

In accordance with 3GPP TS 36.211 V8.7.0, a PUCCH supports a multiple formats. PUCCHs having different numbers of bits per subframe can be used in accordance with a modulation scheme dependent on a PUCCH format.

The table 1 shows an example of modulation schemes and the number of bits per subframe according to PUCCH formats.

TABLE 1

| PUCCH Format | Modulation Scheme | Number of Bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used to transmit an SR (Scheduling Request), the PUCCH formats 1a/1b are used to transmit an ACK/NACK signal for an HARQ, the PUCCH format 2 is used to transmit a CQI, and each of the PUCCH formats 2a/2b is used to simultaneously transmit a CQI and an ACK/NACK signal. When only the ACK/NACK signal is transmitted in a subframe, the PUCCH formats 1a/1b are used, but when only the SR is transmitted in a subframe, the PUCCH format 1 is used. When the SR and the ACK/NACK signal are simultaneously transmitted, the PUCCH format 1 is used. The ACK/NACK signal modulated in resources to which the SR has been allocated is transmitted.

Each of all the PUCCH formats uses the cyclic shift (CS) of a sequence in each OFDM symbol. The cyclic-shifted sequence is generated by cyclically shifting a base sequence by a specific CS amount. The specific CS amount is indicated by a CS index.

An example in which the base sequence $r_u(n)$ is defined is shown as:

$$r_u(n) = e^{jb(n)\pi/4} \quad \text{[Equation 1]}$$

where u indicates a root index, n indicates an element index where $0 \le n \le N-1$, and N indicates the length of the base sequence. b(n) is defined in section 5.5 of 3GPP TS 36.211 V8.7.0.

The length of the base sequence is equal to the number of elements included in the base sequence. u can be determined based on a cell ID (identifier) or a slot number within a radio frame. Assuming that the base sequence is mapped to one resource block in the frequency domain, the length of the base sequence N is 12 because one resource block includes 12 subcarriers. A different base sequence can be defined on the basis of a different root index.

A cyclic-shifted sequence $r(n, I_{CS})$ can be generated by cyclically shifting the base sequence r(n) as shown:

$$r(n, I_{cs}) = r(n) \cdot \exp\left(\frac{j2\pi I_{cs} n}{N}\right), \quad \text{[Equation 2]}$$

$$0 \le I_{cs} \le N-1$$

where $I_{CS}$ is a CS index indicating the CS amount ($0 \le I_{CS} \le N-1$).

Hereinafter, available CS indices of the base sequence refer to CS indices that can be derived from the base sequence on the basis of a CS interval. For example, assuming that the length of the base sequence is 12 and the CS interval is 1, a total number of available CS indices of the base sequence is 12. Assuming that the length of the base sequence is 12 and the CS interval is 2, the number of available CS indices of the base sequence is 6.

A method of transmitting the HARQ ACK/NACK signal in the PUCCH formats 1a/1b is described below.

Figure 6:
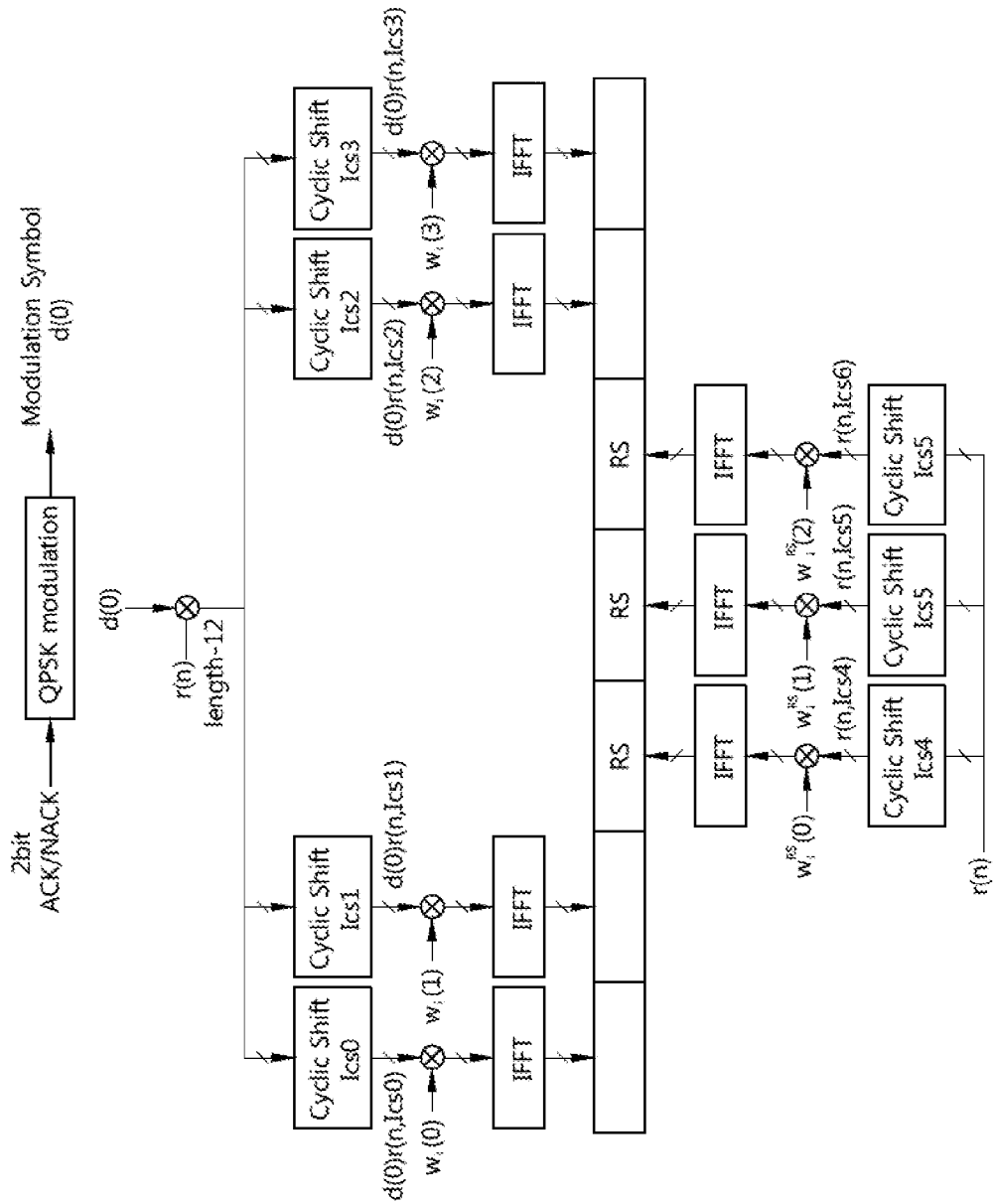
FIG. 6 is a diagram showing a physical uplink control channel (PUCCH) format 1b in a normal cyclic prefix (CP) in 3GPP LTE.

FIG. 6 is a diagram showing the PUCCH format 1b in a normal CP in the 3GPP LTE. On slot includes 7 OFDM symbols. 7 OFDM symbols are divided into 3 reference signal (RS) OFDM symbols and 4 data OFDM symbols for a ACK/NACK signal.

For PUCCH format 1b, a modulation symbol d(0) is generated by modulating a 2-bit ACK/NACK signal through QPSK (Quadrature Phase Shift Keying).

The CS index $I_{CS}$ can vary depending on a slot number ($n_s$) within a radio frame or a symbol index (l) within a slot or both.

Since there are 4 data OFDM symbols used for transmission of the ACK/NACK signal in the normal CP, it is assumed that CS indexes corresponding to 4 data OFDM symbols are $I_{CS0}$, $I_{CS1}$, $I_{CS2}$ and $I_{CS3}$.

The modulation symbol d(0) is spread with a cyclic-shifted sequence $r(n, I_{CS})$. Assuming one-dimensional spread sequence corresponding to an (i+1)th OFDM symbol in a subframe is m(i), for i=0, 1, 2, 3, it can be expressed as:

$$\{m(0), m(1), m(2), m(3)\} = \{d(0)r(n, I_{CS0}), d(0)r(n, I_{CS1}), d(0)r(n, I_{CS2}), d(0)r(n, I_{CS3})\}.$$

To increase UE capacity, the one-dimensional spread sequence can be spread using an orthogonal sequence. An orthogonal sequence $w_i(k)$, where i is a sequence index and $0 \le k \le K-1$, having a spreading factor K=4 may use the following sequence.

TABLE 2

| Index (i) | [$w_i(0), w_i(1), w_i(2), w_i(3)$] |
| --- | --- |
| 0 | [+1, +1, +1, +1] |
| 1 | [+1, −1, +1, −1] |
| 2 | [+1, −1, −1, +1] |

The orthogonal sequence $w_i(k)$, where i is a sequence index and $0 \le k \le K-1$, having a spreading factor K=3 may use the following sequence.

TABLE 3

| Index (i) | [$w_i(0), w_i(1), w_i(2)$] |
| --- | --- |
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used for each slot.

Accordingly, assuming that a certain orthogonal sequence index i is given, 2-dimensional spread sequences s(0), s(1), s(2), s(3) can be expressed as follows:

$$\{\{s(0),s(1),s(2),s(3)\}=\{w_i(0)m(0),w_i(1)m(1),w_i(2)m(2),w_i(3)m(3)\}.$$

The two-dimensional spread sequences {s(0), s(1), s(2), s(4)} are subject to IFFT and then transmitted through corresponding OFDM symbols. Accordingly, the ACK/NACK signal is transmitted on the PUCCH.

A reference signal for the PUCCH format 1b is also transmitted by cyclically shifting the base sequence r(n) and then by spreading it by the use of an orthogonal sequence. When cyclic-shift indices corresponding to three RS OFDM symbols are denoted by $I_{CS4}$, $I_{CS5}$, and $I_{CS6}$, three cyclic-shifted sequences $r(n,I_{CS4})$, $r(n,I_{CS5})$, and $r(n,I_{CS6})$ may be obtained. The three cyclic-shifted sequences are spread by the use of an orthogonal sequence $w^{RS}_i(k)$ having a spreading factor K=3.

An orthogonal sequence index i, a cyclic shift index $I_{CS}$, and a resource block index m are parameters required to configure the PUCCH and are also resources used to identify the PUCCH (or UE). If the number of available cyclic shifts is 12 and the number of available orthogonal sequence indices is 3, PUCCHs for 36 UEs in total may be multiplexed to one resource block.

In the 3GPP LTE, a resource index $n^{(1)}_{PUUCH}$ is defined in order for the UE to obtain the three parameters for configuring the PUCCH. The resource index $n^{(1)}_{PUUCH}$ is defined to $n_{CCE}+N^{(1)}_{PUUCH}$, where $n_{CCE}$ is an index of a first CCE used for transmission of a corresponding DCI (i.e., DL resource allocation used to receive DL data corresponding to an ACK/NACK signal), and $N^{(1)}_{PUUCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) may be expressed with at least any one of an orthogonal sequence index i, a cyclic shift index $I_{CS}$, a resource block index m, and an index for obtaining the three indices. The ACK/NACK resource may include at least one of an orthogonal sequence, a cyclic shift, a resource block, and a combination thereof.

Consequently, a resource used for PUCCH transmission may be implicitly determined depending on a resource of a corresponding PDCCH. This is because the BS does not additionally report a resource used by the UE in PUCCH transmission for the ACK/NACK signal, and reports it indirectly by using a resource used for the PDCCH for scheduling of a DL transfer block.

Figure 7:
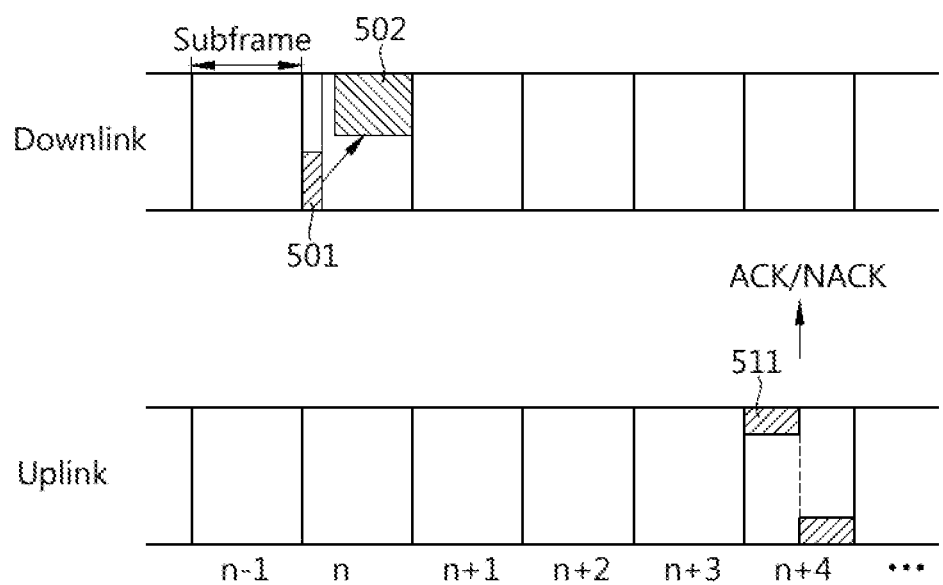
FIG. 7 shows an example of performing hybrid automatic repeat request (HARQ).

FIG. 7 shows an example of performing HARQ.

By monitoring a PDCCH, a UE receives a DL resource allocation on a PDCCH 501 in an $n^{th}$ DL subframe. The UE receives a DL transport block through a PDSCH 502 indicated by the DL resource allocation.

The UE transmits an ACK/NACK signal for the DL transport block on a PUCCH 511 in an $(n+4)^{th}$ UL subframe. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until up to a maximum number of retransmission attempts.

To configure the PUCCH 511, the UE uses a resource allocation of the PDCCH 501. That is, a lowest CCE index (or an index of a first CCE) used for transmission of the PDCCH 501 is $n_{CCE}$, and a resource index is determined as $n^{(1)}_{PUUCH}=n_{CCE}+N^{(1)}_{PUUCH}$.

Now, CQI transmission in the PUCCH format 2 will be described.

Hereinafter, a CQI is only one example of a UL control signal transmitted using the PUCCH format 2. The CQI can include a wideband CQI, a subband CQI, a precoding matrix indication (PMI) indicating an index of a precoding matrix, and/or rank indication (RI) indicating a rank.

Figure 8:
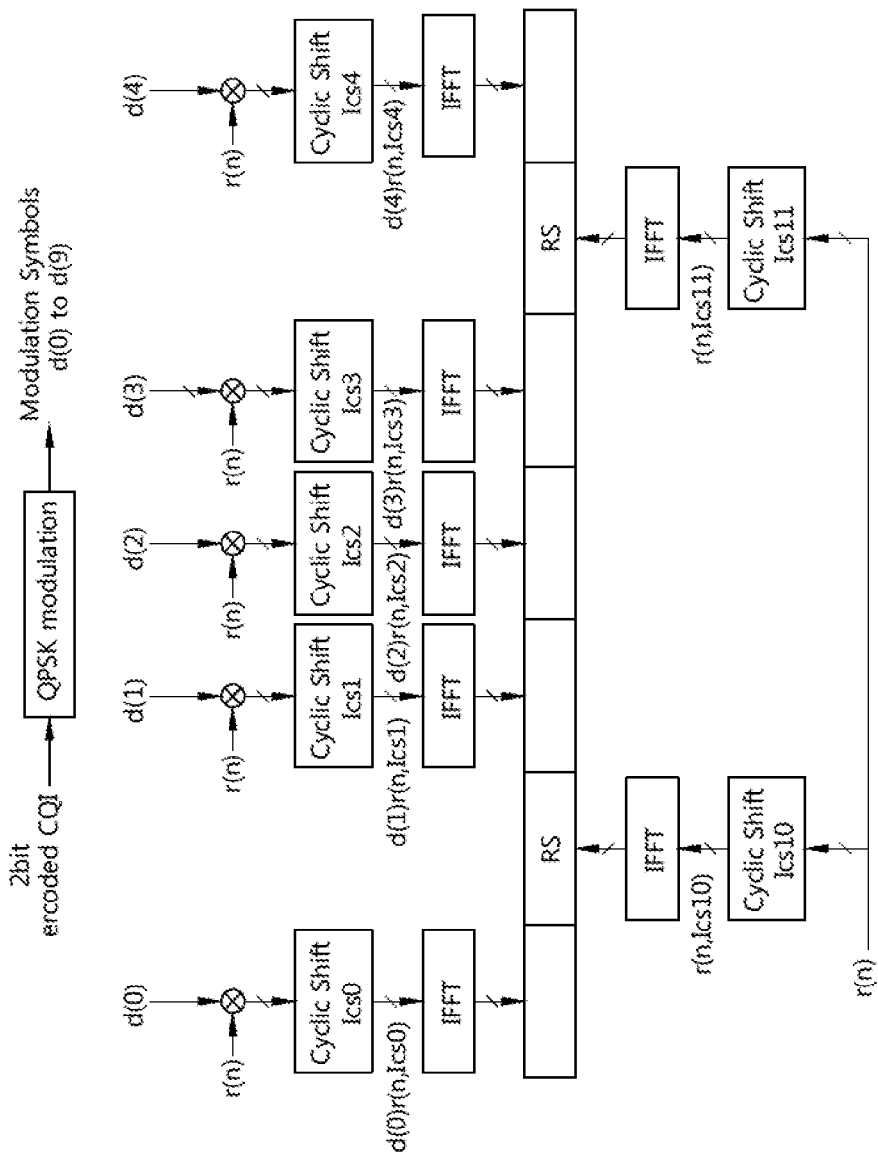
FIG. 8 shows a PUCCH format 2 in case of using a normal CP in 3GPP LTE.

FIG. 8 shows a PUCCH format 2 in case of using a normal CP in 3GPP LTE. One slot includes 7 OFDM symbols. Two OFDM symbols are used as RS OFDM symbols for a reference signal. Five OFDM symbols are used as data OFDM symbols for a CQI.

Channel coding is performed on a CQI payload to generate an encoded CQI. In 3GPP LTE, a payload of the PUCCH format 2 is up to 13 bits, and a 20-bit encoded CQI is generated always irrespective of a size of a payload in use.

From the 20-bit encoded CQI, 10 modulation symbols d(0), . . . , d(9) are generated by using quadrature phase shift keying (QPSK) modulation. Since one slot has five OFDM symbols for CQI transmission in the normal CP or the extended CP, one subframe has 10 OFDM symbols for CQI transmission. Therefore, 10 modulation symbols are generated such that one modulation symbol corresponds to one OFDM symbol.

A CS index $I_{CS}$ can vary depending on a slot number $n_s$ in a radio frame and/or a symbol index l in a slot.

In the normal CP, 5 data OFDM symbols exist in one slot for CQI transmission. Cyclic shift indices corresponding to the respective data OFDM symbols are denoted by $I_{CS0}$, $I_{CS1}$, $I_{CS2}$, $I_{CS3}$, and $I_{CS4}$.

The modulation symbol corresponding to each OFDM symbol is spread to a cyclically-shifted sequence $r(n,I_{CS})$. When a spread sequence corresponding to an $(i+1)^{th}$ OFDM symbol in a subframe is denoted by s(i), it can be expressed as follows.

$$\{s(0),s(1),s(2),s(3),s(4)\}=\{d(0)r(n,I_{CS0}),d(1)r(n,I_{CS1}),d(2)r(n,I_{CS2}),d(3)r(n,I_{CS3}),d(4)r(n,I_{CS4})\}$$

The spread sequences {s(0), s(1), s(2), s(3), s(4)} are subjected to IFFT, and thereafter are transmitted in corresponding OFDM symbols. Accordingly, the CQI is transmitted on the PUCCH.

The UE has to know a CS index $I_{CS}$ and an RB index m to constitute the PUCCH format 2. In 3GPP LTE, the BS reports one resource index $n_{PUCCH}^{(2)}$ to the UE, and the UE acquires the CS index $I_{CS}$ and the RB index m on the basis of a resource index $n_{PUCCH}^{(2)}$.

A reference signal of the PUCCH format 2 is also transmitted by cyclically shifting the base sequence r(n) and then by spreading it using an orthogonal sequence. When cyclic-shift indices corresponding to two RS OFDM symbols are denoted by $I_{CS10}$ and $I_{CS11}$, two cyclic-shifted sequences $r(n,I_{CS10})$ and $r(n,I_{CS11})$ can be obtained. The cyclic-shifted sequences are subjected to IFFT, and thereafter are transmitted in corresponding OFDM symbols.

A PUCCH format 3 is discussed in addition to the PUCCH formats of the conventional 3GPP LTE shown in Table 1.

Figure 9:
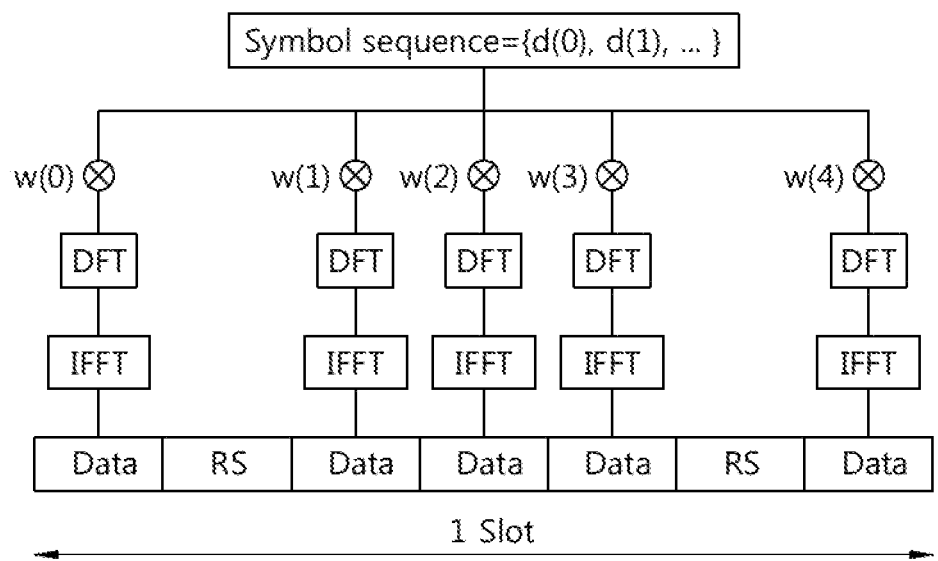
FIG. 9 shows a PUCCH format 3 in case of using a normal CP.

FIG. 9 shows a PUCCH format 3 in case of using a normal CP. One slot includes 7 OFDM symbols. Two OFDM symbols are used as RS OFDM symbols for a reference signal. Five OFDM symbols are used as data OFDM symbols for an uplink control signal (e.g., an ACK/NACK signal). The location and the number of the RS OFDM symbol and the data OFDM symbol are for exemplary purposes only.

The PUCCH format 3 uses DFT-IFFT and block-spreading.

A symbol sequence {d(0), d(1), ... } is spread by an orthogonal sequence. The symbol sequence is a set of complex-valued symbols which express an uplink control signal. Since there are 5 data OFDM symbols, block-spreading is performed by an orthogonal sequence {w(0), w(1), w(2), w(3), w(4)} having a spreading factor of 5.

The block-spread symbol sequence is subjected to discrete Fourier transform (DFT). Thereafter, the block-spread symbol sequence is subjected to IFFT, and is then mapped to data OFDM symbols.

Unlike other PUCCH formats in which multiplexing is performed by using cyclic shift, the PUCCH format 3 performs multiplexing by using an orthogonal sequence. Although multiplexing capacity is decreased, a channel payload can be increased.

Now, ACK/NACK transmission in 3GPP LTE time division duplex (TDD) will be described.

TDD differs from frequency division duplex (FDD) in that a UI, subframe and a DL subframe coexist in one radio frame. In general, the number of UL subframes is less than the number of DL subframes. Therefore, since there is not enough UL subframes for transmitting an ACK/NACK signal, it is supported to transmit a plurality of ACK/NACK signals for a plurality of DL transport blocks in one UL subframe. According to the section 10.1 of 3GPP TS 36.213 V8.7.0 (2009-05), two ACK/NACK modes, i.e., channel selection and bundling, are introduced.

First, bundling is an operation in which ACK is transmitted when decoding of all PDSCHs (i.e., DL transport blocks) received by a UE is successful, and otherwise NACK is transmitted.

Second, channel selection is also called ACK/NACK multiplexing. The UE transmits ACK/NACK by selecting a plurality of reserved PUCCH resources.

Assume that M DL subframes are linked to a UL subframe n.

When M=3, an example of channel selection is as shown in Table 4 below.

TABLE 4

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe. According to Table 3 above, there are three PUCCH resources $n^{(1)}_{PUCCH,0}$, $n^{(1)}_{PUCCH,1}$, and $n^{(1)}_{PUCCH,2}$, and b(0) and b(1) are two bits transmitted by using a selected PUCCH.

For example, if the UE successfully receives three DL transport blocks in three DL subframes, the UE transmits bits (1,1) on the PUCCH by using $n^{(1)}_{PUCCH,2}$. If the UE fails to decode the DL transport block and succeeds in the decoding of the remaining transport blocks in a $1^{st}$ (i=0) DL subframe, the UE transmits bits (1,0) on the PUCCH by using $n^{(1)}_{PUCCH,2}$.

In channel selection, NACK and DTX are coupled if there is at least one ACK. This is because all ACK/NACK states cannot be expressed by combining a reserved PUCCH resource and a QPSK symbol. However, if the ACK does not exist, the DTX is decoupled from the NACK.

The conventional PUCCH format 1b can transmit only 2-bit ACK/NACK. However, channel selection links the allocated PUCCH resources and an actual ACK/NACK signal and thus expresses more ACK/NACK states.

Now, a multiple-carrier system will be described.

A 3GPP LTE system supports a case where a DL bandwidth and a UL bandwidth are set differently only under the assumption that one component carrier (CC) is used. The 3GPP LTE system supports up to 20 MHz. The UL bandwidth can be different from the DL bandwidth. Only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

Figure 10:
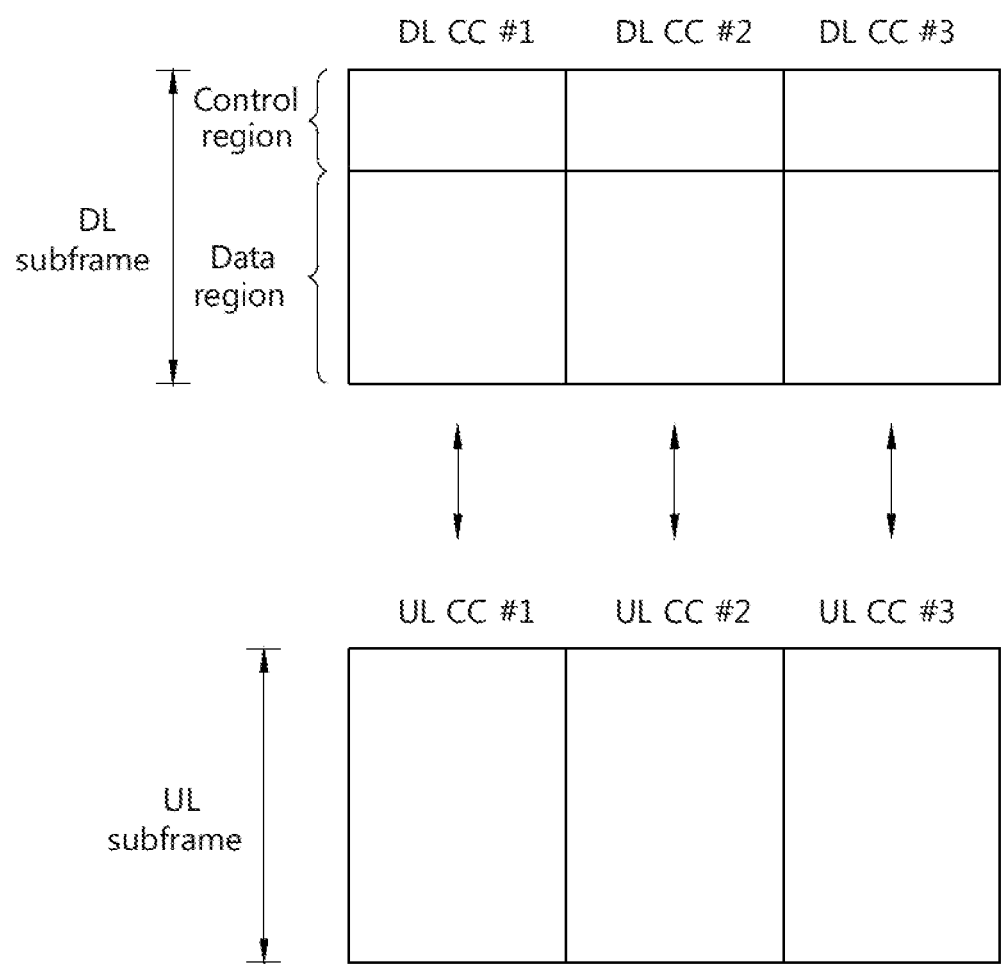
FIG. 10 shows an example of multiple carriers.

FIG. 10 shows an example of multiple carriers.

Although 3 DL CCs and 3 UL CCs are shown herein, the number of DL CCs and the number of UL CCs are not limited thereto. In each DL CC, a PDCCH and a PDSCH are independently transmitted. In each UL CC, a PUCCH and a PUSCH are independently transmitted.

A UE can monitor the PDCCH in a plurality of DL CCs, and can receive a DL transport block simultaneously through the plurality of DL CC. The UE can transmit a plurality of UL transport blocks simultaneously through a plurality of UL CCs.

Two CC scheduling methods are possible in a multi-carrier system.

First, a PDCCH-PDSCH pair is transmitted in one CC. This CC is called self-scheduling. In addition, this implies that a UL CC in which a PUSCH is transmitted is a CC linked to a DL CC in which a corresponding PDCCH is transmitted. That is, the PDCCH allocates a PDSCH resource on the same CC, or allocates a PUSCH resource on a linked UL CC.

Second, a DL CC in which the PDSCH is transmitted or a UL CC in which the PUSCH is transmitted is determined irrespective of a DL CC in which the PDCCH is transmitted. That is, the PDCCH and the PDSCH are transmitted in different DL CCs, or the PUSCH is transmitted through a UL CC which is not linked to the DL CC in which the PDSCH is transmitted. This is called cross-carrier scheduling. A CC in which the PDCCH is transmitted is called a PDCCH carrier, a monitoring carrier, or a scheduling carrier. A CC in which the PDSCH/PUSCH is transmitted is called a PDSCH/PUSCH carrier or a scheduled carrier.

Figure 11:
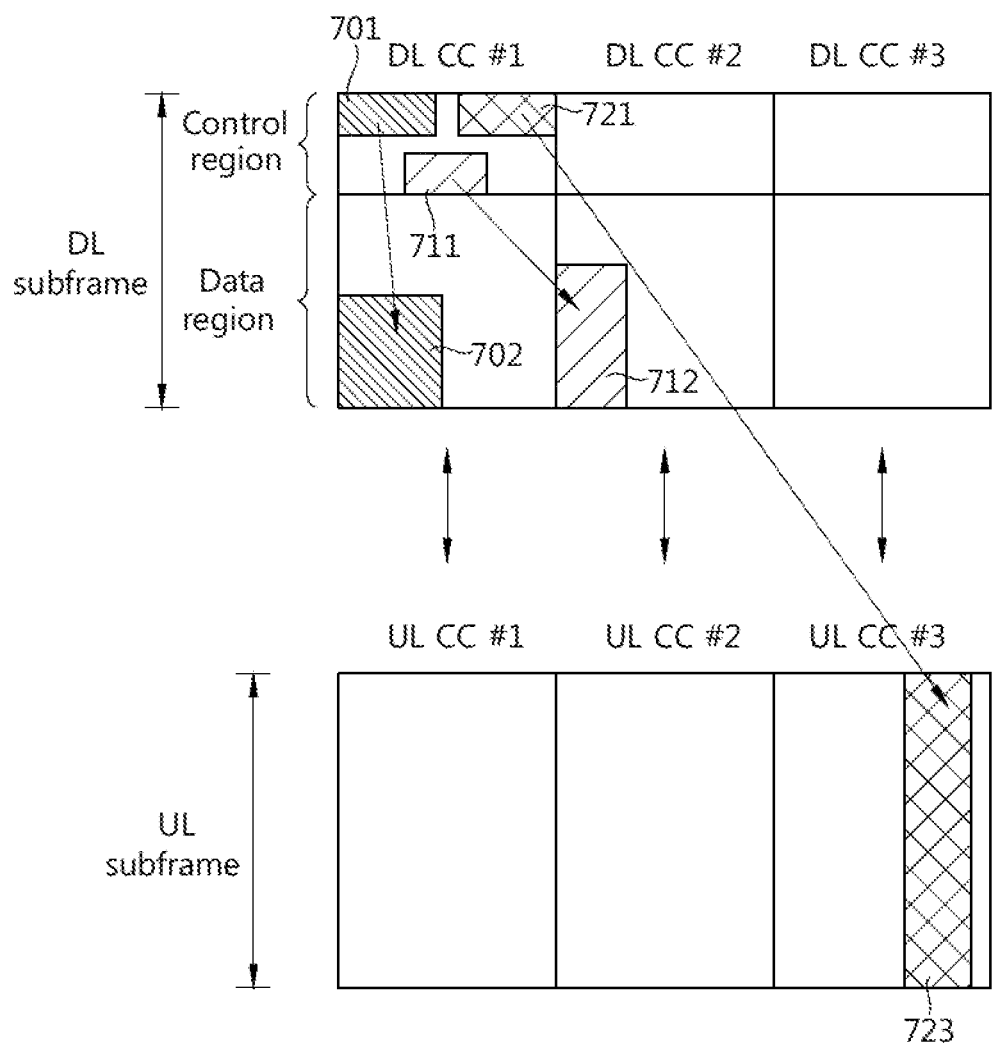
FIG. 11 shows an example of cross-carrier scheduling.

FIG. 11 shows an example of cross-carrier scheduling. It is assumed that a DL CC #1 is linked to a UL CC #1, a DL CC #2 is linked to a UL CC #2, and a DL CC #3 is linked to a UL CC #3.

A $1^{st}$ PDCCH 710 of the DL CC #1 carries DCI for a PDSCH 702 of the same DL CC #1. A $2^{nd}$ PDCCH 711 of the DL CC #1 carries DCI for a PDSCH 712 of the DL CC #2. A $3^{rd}$ PDCCH 721 of the DL CC #1 carries DCI for a PUSCH 722 of the unlinked UL CC #3.

For cross-carrier scheduling, the DCI of the PDCCH may include a carrier indicator field (CIF). The CIF indicates a DL CC or a UL CC scheduled through the DC. For example, the $2^{nd}$ PDCCH 711 may include a CIF indicating the DL CC #2. The $3^{rd}$ PDCCH 721 may include a CIF indicating the UL CC #3.

Cross-carrier scheduling can be activated/deactivated for each UE. For example, a BS can report to a UE whether the CIF is included in the DCI. When cross-carrier scheduling is activated, the UE can receive the DCI including the CIF. From the CIF included in the DCI, the UE can know a specific scheduled CC for which the received PDCCH is used as control information.

To reduce an overhead caused by PDCCH monitoring, only M (M<N) DL CCs can be monitored even if N DL CCs are supported. A CC for monitoring the PDCCH is called a monitoring CC. A set of monitoring CCs is called a monitoring CC set.

For example, if the DL CC #1 is a monitoring CC and the DL CC #2 and the DL CC #3 are non-monitoring CCs, the UE can perform blind decoding of the PDCCH only in the DL CC #1.

Figure 12:
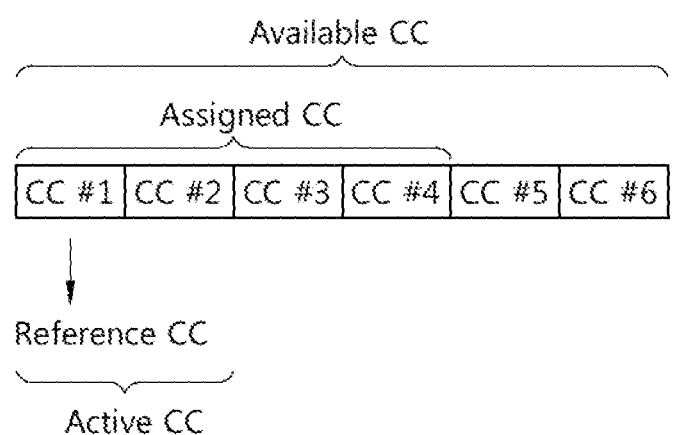
FIG. 12 shows an example of a multi-carrier operation.

FIG. 12 shows an example of a multi-carrier operation. Even if a multi-carrier system supports a plurality of CCs, the number of supported CCs may differ depending on a cell or UE capability.

An available CC indicates all CCs that can be used by the system. Herein, there are 6 CCs (i.e., CC #1 to CC #6).

An assigned CC is a CC assigned by a BS to a UE according to the UE capacity among available CCs. Although it is shown that the CC #1 to the CC #4 are assigned CCs, the number of assigned CCs may be less than or equal to the number of available CCs.

An active CC is a CC used by the UE to perform reception and/or transmission of a control signal and/or data with respect to the BS. The UE can perform PDCCH monitoring and/or PDSCH buffering with respect to some or all of the active CCs. The active CC can be activated or deactivated among the assigned CCs.

One of the active CCs is a reference CC. The reference CC is also called a primary CC or an anchor CC. The reference CC is a CC in which information necessary for a system operation is transmitted such as system information and/or multi-carrier operation information. The reference CC is always activated, and is a monitoring CC.

Now, a problem occurring when the aforementioned PUCCH structure applies to multiple carriers will be described.

A PUCCH format used for transmission of an ACK/NACK signal is a PUCCH format 1a/1b and a PUCCH format 2a/2b. A 2-bit payload is used for transmission of the ACK/NACK signal in this PUCCH format.

If there are four DL CCs and a UE receives four DL transport blocks, a channel having a 4-bit payload is required. Since 4 bits cannot be transmitted in one PUCCH when using the conventional PUCCH format 1a/1b and PUCCH format 2a/2b, a method of using a plurality of PUCCHs and a method of using a PUCCH format 2/3 in ACK/NACK signal transmission are proposed.

When using two PUCCHs (e.g., two PUCCH formats 1b), an up to 4-bit ACK/NACK signal can be transmitted. However, the use of the plurality of PUCCHs requires great transmission power, and may increase a peak-to-average power ratio (PAPR).

Transmission of an ACK/NACK signal having a greater payload by using the conventional PUCCH format 2 or 3 is also being discussed.

Since the PUCCH format 2 can transmit up to 20 bits, a 20-bit encoded ACK/NACK signal is generated by encoding an ACK/NACK signal of 1 to 20 bits in the same method used in the CQI encoding. The 20-bit encoded ACK/NACK signal is subjected to QPSK modulation to generate 10 modulation symbols, and the generated symbols are transmitted by spreading the symbols in a frequency domain.

Figure 13:
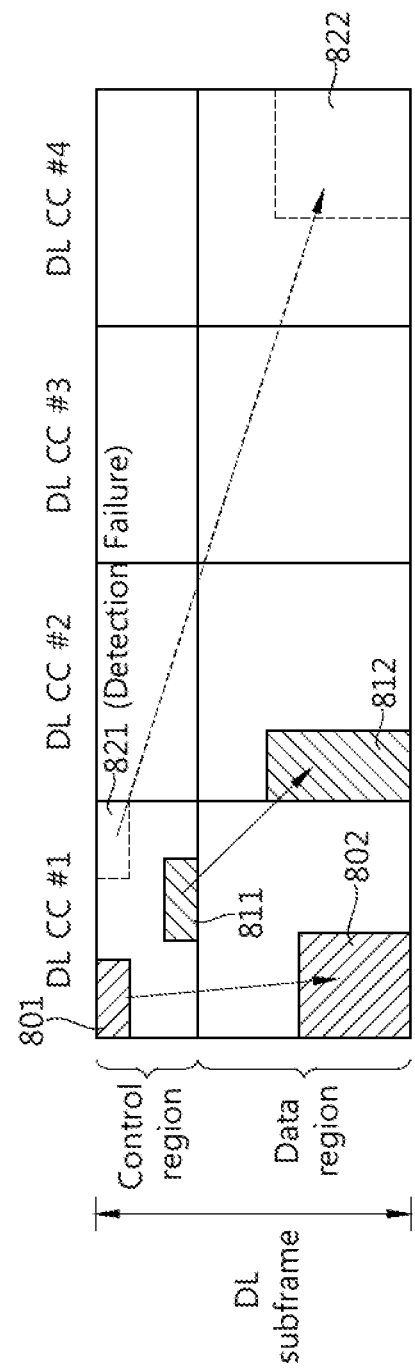
FIG. 13 shows an example of a PDCCH detection failure.

FIG. 13 shows an example of a PDCCH detection failure.

A $1^{st}$ PDCCH 801 of a DL CC #1 carries DCI for a PDSCH 802 of the DL CC #1. A $2^{nd}$ PDCCH 811 of the DL CC #1 carries DCI for a PDSCH 812 of a DL CC #2. A $3^{rd}$ PDCCH 821 of the DL CC #1 carries DCI for a PDSCH 822 of a UL CC #4. The DL CC #1 is a monitoring CC.

When a UE normally receives all of the PDCCHs 801, 802, and 803 and one DL transport block is transmitted on each of the PDSCHs 802, 812, and 822, a 3-bit ACK/NACK signal is required. Therefore, the UE encodes the 3-bit ACK/NACK signal to generate a 20-bit encoded ACK/NACK signal. The 20-bit encoded ACK/NACK signal is subjected to QPSK modulation to generate 10 modulation symbols, and the generated symbols are transmitted by being spread in a frequency domain.

However, assume that the UE fails to detect the $3^{rd}$ PDCCH 821. Since the $3^{rd}$ PDCCH 821 cannot be received, the UE receives only the $1^{st}$ and $2^{nd}$ PDCCHs 802 and 803. As a result, the UE transmits a 2-bit ACK/NACK signal by encoding the signal with a PUCCH format 2. Since a BS cannot know that the UE fails to detect the $3^{rd}$ PDCCH 821, decoding is attempted by recognizing a size of the received ACK/NACK signal as 3 bits. As a result, the BS and the UE exchange the wrong ACK/NACK signal.

In order to solve the aforementioned problem, it is proposed to use different PUCCH resources according to a payload of a transmitted ACK/NACK signal and/or the number of scheduled PDSCHs (or received PDCCHs) when a plurality of PDSCHs are transmitted through a plurality of CCs.

A PUCCH resource can be divided into a time, a space, a frequency, and/or a code. More specifically, the PUCCH resource can be expressed in at least one of an orthogonal sequence index i, a cyclic shift index $I_{CS}$, a resource block index m, and an index for obtaining the above three indices. Alternatively, different PUCCH resources can be expressed with different PUCCH formats.

The different PUCCH resources can be allocated exclusively for a reference signal and/or a control signal.

If semi-persistent scheduling (SPS) is activated, the UE can receive the PDSCH without additional PDCCH monitoring. The exclusive PUCCH resources can be allocated by also including the number of PDSCHs to be SPS scheduled in a corresponding subframe.

Figure 14:
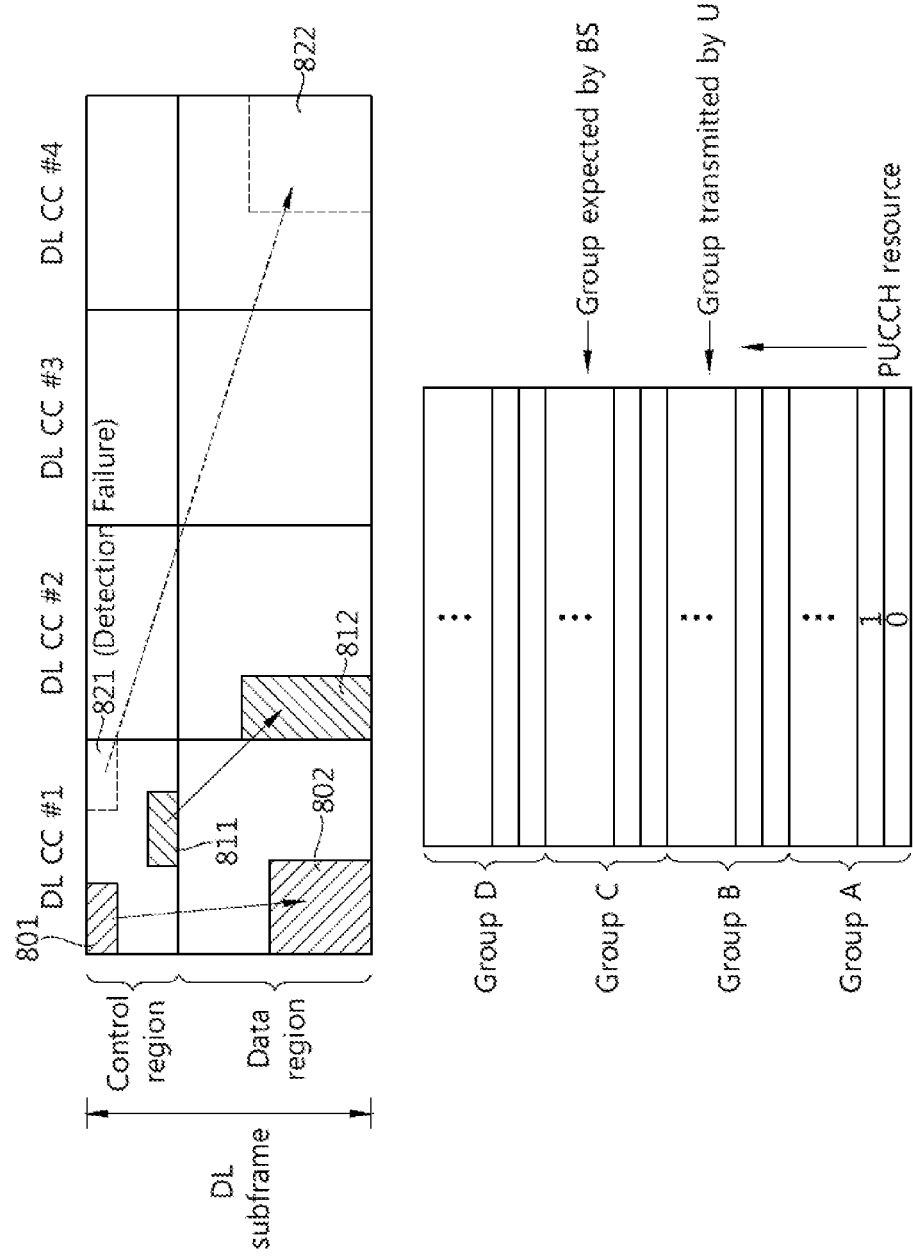
FIG. 14 shows a method of transmitting a positive-acknowledgement (ACK)/negative-acknowledgement (NACK) signal according to an embodiment of the present invention.

FIG. 14 shows a method of transmitting an ACK/NACK signal according to an embodiment of the present invention.

Available PUCCH resources are divided into four groups (i.e., groups A, B, C, and D). The group A is a set of PUCCH resources to be used when one PDSCH is scheduled. The group B is a set of PUCCH resources to be used when two PDSCHs are scheduled. The group C is a set of PUCCH resources to be used when three PDSCHs are scheduled. The group D is a set of PUCCH resources to be used when four PDSCHs are scheduled.

As shown in the example of FIG. 13, it is assumed that a reception error occurs in the $3^{rd}$ PDCCH 821. Since two PDSCHs 802 and 812 are scheduled to the UE, the UE transmits an ACK/NACK signal by using a PUCCH resource belonging to the group B. Since three PDSCHs are scheduled to the BS, the BS waits to receive an ACK/NACK signal by using a PUCCH resource belonging to the group C.

Therefore, upon receiving the ACK/NACK signal belonging to the group B, the BS can confirm that the UE fails to receive one PDCCH.

If up to four CCs can be scheduled to the UE, each of the PUCCH resources A, B, C, and D is reserved as an exclusive resource (or group) for each CC. When one PDCCH is received, the UE transmits an ACK/NACK signal corresponding to a scheduled PDSCH by using the PUCCH resource A. When two PDCCHs are received, the UE transmits an ACK/NACK signal corresponding to a scheduled PDSCH by using the PUCCH resource B.

Information regarding a PUCCH resource (or PUCCH group) reserved for each CC (or PDSCH to be scheduled) may be predetermined or may be reported by the BS to the UE.

A PUCCH format can be used differently depending on the number of CCs to be scheduled or the number of PDSCHs to be scheduled. If the number of CCs to be scheduled is less than or equal to 2, the PUCCH format 1a/1b is used. If the number of CCs to be scheduled is greater than 2, the PUCCH format 2 or 3 is used.

A PUCCH resource used for transmission of the PUCCH format 1a/1b can be assigned in the same manner as that used in 3GPP LTE shown in FIG. 9. If there is a PDCCH for scheduling a PDSCH, a dynamic PUCCH resource is used. In this case, the dynamic PUCCH resource corresponds to a CCE in which the PDCCH is used. If the PDSCH is scheduled without the PDCCH during a specific time duration similarly to SPS, a PUCCH resource designated with higher-layer signaling (e.g., RRC message) is used.

In the exclusive PUCCH resource (or group), the number of CCs to be scheduled or the number of PDSCHs to be scheduled may correspond to each other in a 1:1 manner, or may not correspond to each other. If the number of CCs that can be scheduled is M (M>1), N (N>1) exclusive PUCCH resources can be reserved.

In order to decrease complexity for ACK/NACK signal detection of the BS, an exclusive PUCCH resource can be reserved for a PDSCH or PDCCH transmitted through a specific CC.

When a PDCCH-PDSCH pair is transmitted in one CC, a PDCCH and a PDSCH which is scheduled by the PDCCH are transmitted in the same CC. In this case, exclusive allocation of the PUCCH resource when the PDSCH is transmitted can be equivalent to exclusive allocation of the PUCCH resource when the PDCCH is transmitted.

The BS can report to the UE about selection information regarding which resource will be used among exclusively reserved PUCCH resources (or resource group) through an RRC message or a PDCCH. A field for indicating selection of the reserved PUCCH resource can be included in DCI. Alternatively, CRC masking and/or a reserved scrambling code for indicating selection of the reserved PUCCH resource can be used.

The selection information can be indicated by the number of PDCCHs or the number of PDSCHs to be scheduled.

The DCI on the PDCCH can include not only a resource allocation but also a counter field indicating a specific order of the PDSCH which is scheduled by the PDCCH. For example, a counter value of DCI of a $1^{st}$ PDCCH is 1, a counter value of DCI of a $2^{nd}$ PDCCH is 2, and a counter value of a $3^{rd}$ PDCCH is 3. The UE transmits an ACK/NACK signal by using a PUCCH resource corresponding to a last counter value among PDCCHs which are successfully received by the UE. Therefore, the UE can know a specific order of a PDCCH when the UE fails to detect the PDCCH, and can includes information thereof to the ACK/NACK signal. Assume that the UE receives the $1^{st}$ PDCCH, fails to receive the $2^{nd}$ PDCCH, and receives the $3^{rd}$ PDCCH. Since a counter value of DCI of the $3^{rd}$ PDCCH is 3, the UE knows that detection of the $2^{nd}$ PDCCH fails, and reports this to the BS by using NACK or discontinuous transmission (DTX).

When a counter is included in the DCI, the UE can transmit an ACK/NACK signal corresponding to the maximum number of transport blocks for each CC group. For example, it is assumed that the UE can use 5 CCs, 3 CCs belong to a $1^{st}$ CC group, and the remaining 2 CCs belong to a $2^{nd}$ CC group. If up to 2 transport blocks can be transmitted for each CC, an ACK/NACK signal can be transmitted for 6 transport blocks with respect to the $1^{st}$ CC group and an ACK/NACK signal can be transmitted for 4 transport blocks with respect to the $2^{nd}$ CC group. The UE can select from the received counter a PUCCH resource on the basis of the maximum number of corresponding PDSCHs or the number of transport blocks.

Figure 15:
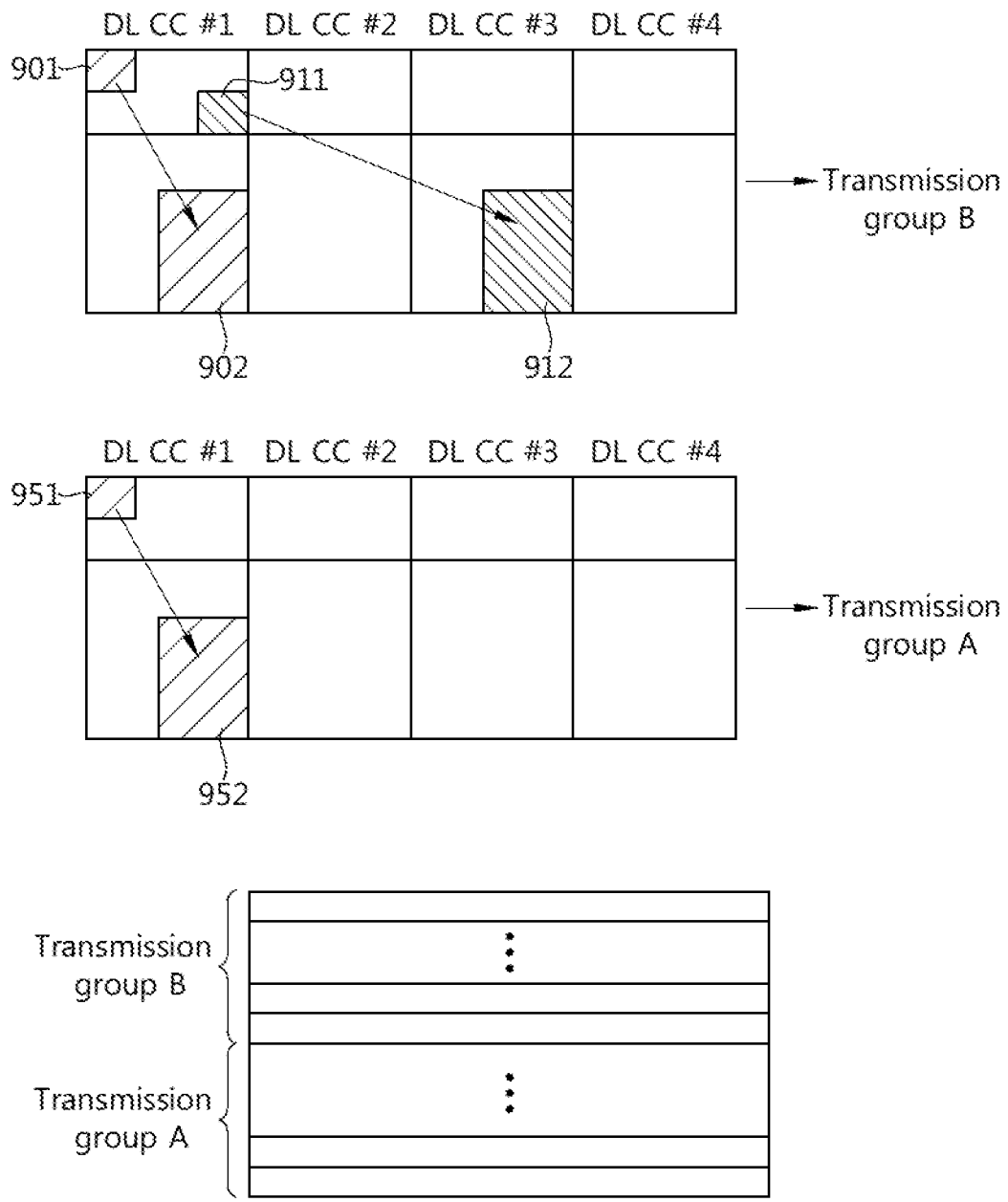
FIG. 15 shows a method of transmitting an ACK/NACK signal according to another embodiment of the present invention.

FIG. 15 shows a method of transmitting an ACK/NACK signal according to another embodiment of the present invention.

Available PUCCH resources are divided into two groups (i.e., groups A and B).

The transmission group A is a set of PUCCH resources used when a PDSCH (or PDCCH) is scheduled only in a specific CC. The transmission group B is a set of PUCCH resources to be used when the resources do not belong to the transmission group A.

In a certain subframe, a $1^{st}$ PDCCH 901 of a DL CC #1 carries DCI for a PDSCH 902 of the DL CC #1. A $2^{nd}$ PDCCH 911 of the DL CC #1 carries DCI for a PDSCH 912 of a DL CC #2. Therefore, an ACK/NACK signal for the PDSCHs 902 and 921 is selected from PUCCH resources in the transmission group B.

Next, a PDCCH 951 of the DL CC #1 carries DCI for a PDSCH 952 of the DL CC #1. When a specific CC is denoted by the DL CC #1, an ACK/NACK signal for the PDSCH 951 is selected from PUCCH resources in the transmission group A.

The transmission group A and the transmission group B may be different PUCCH resources (i.e., a cyclic shift index, an orthogonal sequence index, a resource block index, etc.), and may express different PUCCH formats. For example, the transmission group A may indicate a PUCCH format 1/1a/1b, and the transmission group B may indicate a PUCCH format 2 or 3.

The transmission group A and the transmission group B may use different transmission schemes. For example, the conventional TDD scheme uses channel selection or bundling, whereas a TDD scheme in which a plurality of frequency bands are aggregated may use the PUCCH format 3 to transmit more ACK/NACK bits. In this case, the transmission group A may use channel selection or bundling, and the transmission group B may use the PUCCH format 3.

The DL CC #1, that is, a CC used by the group A, may be a primary CC (or a reference CC). If scheduling is performed only in the primary CC, the PUCCH format 1a/1b is used, and in the remaining cases, the PUCCH format 2 and/or 3 are used.

If there is no need to support a high data rate even if a plurality of CCs are configured, there is a high possibility that only one CC is used. In this case, a CC used in general may be the primary CC. When only the primary CC is scheduled, it is possible to avoid unnecessary transmission of an ACK/NACK signal for all of configured CCs In addition, in cross-carrier scheduling, the primary carrier can provide backward compatibility to 3GPP LTE. The primary CC maintains the conventional PUCCH structure for ACK/NACK, and regarding cross-carrier scheduling, uses a different PUCCH resource or a different PUCCH format. An ACK/NACK signal of a great payload can be supported while maintaining backward compatibility.

When applying the aforementioned structure to the primary CC, a reconfiguration ambiguity can be solved.

Figure 16:
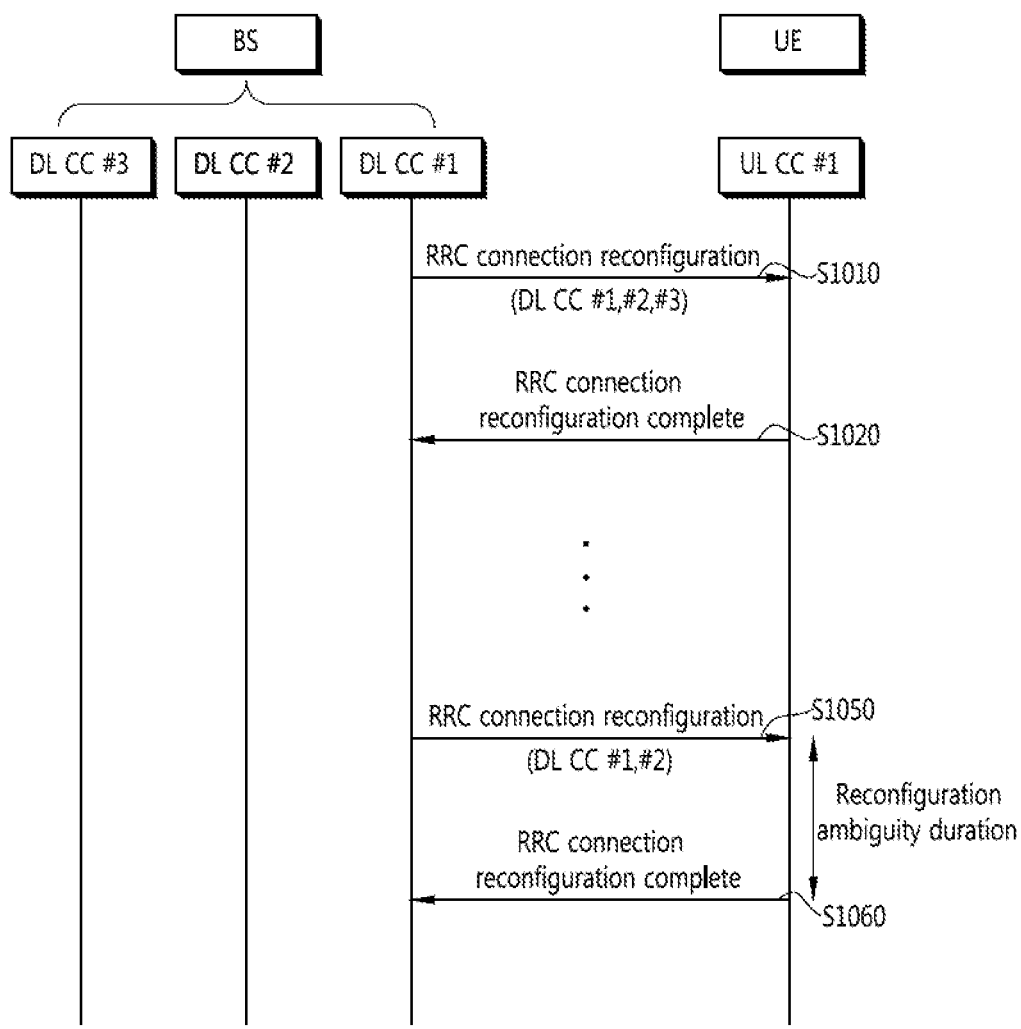
FIG. 16 shows an example of a reconfiguration ambiguity.

FIG. 16 shows an example of a reconfiguration ambiguity.

Assume that a BS and a UE support three DL CCs (i.e., DL CC #1, #2, and #3) and one UL CC. The DL CC #1 is a primary CC.

The BS transmits an RRC connection reconfiguration message to the UE through the DL CC #1 (step S1010). The UE sends an RRC connection reconfiguration complete message in response to the RRC connection reconfiguration message (step S1020).

The RRC connection reconfiguration message may be a setup message which allocates a CC to the UE or which activates/deactivates the CC. The RRC connection reconfiguration complete message is a response message for the CC setup. It is assumed herein that all of the DL CC #1, #2, and #3 are activated through the RRC connection reconfiguration message.

Thereafter, the BS transmits the RRC connection reconfiguration message which deactivates the DL CC #3 to the UE through the DL CC #1 (step S1050). The UE sends the RRC connection reconfiguration complete message in response to the RRC connection reconfiguration message (step S1060).

A time when a higher layer message such as an RRC message is actually transmitted can be known even if an RRC layer instructs transmission to a lower layer. In addition, the RRC message may be lost during transmission.

Therefore, when the BS immediately deactivates the DL CC #3 by triggering the RRC connection reconfiguration message, a mismatch occurs in which the BS uses two DL CC but the UE recognizes that the BS uses three DL CCs. A duration in which a CC ambiguity may occur due to the CC reconfiguration between the BS and the UE is called a reconfiguration ambiguity duration.

An RRC message such as the RRC connection reconfiguration message can be scheduled only in the primary CC. Therefore, a PDSCH which is scheduled or a PDCCH which is monitored only in the primary CC directly uses a PUCCH format 1a/1b for an ACK/NACK signal in a single carrier, and uses a PUCCH format 2/3 or a new PUCCH format in other cases (i.e., cross-carrier scheduling, scheduling in a CC other than the primary CC, etc.). Accordingly, backward compatibility at the primary CC and a payload of an ACK/NACK signal to be added can be ensured.

Figure 17:
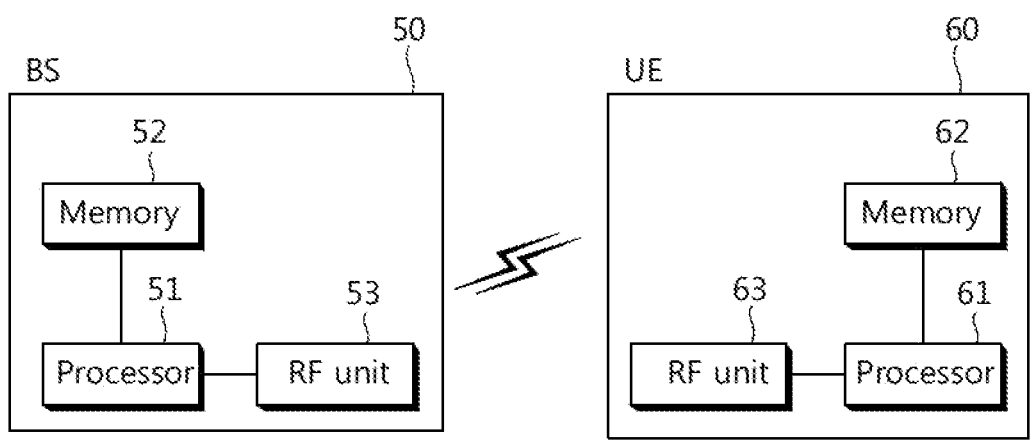
FIG. 17 is a block diagram showing a wireless communication system according to an embodiment of the present invention.

FIG. 17 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the proposed functions, procedures, and/or methods. The processor 51 can implement an operation of the BS according to the embodiments of FIG. 14 and FIG. 15.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal.

The processor 61 implements the proposed functions, procedures, and/or methods. The processor 51 can implement an operation of the UE according to the embodiments of FIG. 14 and FIG. 15.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be placed inside or outside the processor and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for configuring an acknowledgement for a hybrid automatic repeat request (HARQ) in a wireless communication system, the method comprising:
   receiving downlink data through one of a first downlink component carrier and a second downlink component carrier from a base station;
   determining whether the first downlink component carrier or the second downlink component carrier is used for receiving the downlink data; and
   determining a resource used for a physical uplink control channel (PUCCH) to transmit an ACK/NACK signal for the downlink data in accordance with the determination,
   wherein if the first downlink component carrier is used for receiving the downlink data, the resource used for the PUCCH is determined by using a control channel element (CCE) of a physical downlink control channel (PDCCH) associated with the downlink data,
   wherein if the second downlink component carrier is used for receiving the downlink data, the resource used for the PUCCH is determined by using a radio resource control (RRC) message, and
   wherein the resource used for the PUCCH is associated with an orthogonal sequence with which the ACK/NACK signal is spread.

2. The method of claim 1, wherein the first downlink component carrier is a primary component carrier, and the second component carrier is a secondary component carrier.

3. The method of claim 1, wherein a radio resource allocated for the downlink data is indicated by downlink control information (DCI) and received through the PDCCH.

4. The method of claim 1, wherein if the first downlink component carrier is used for receiving the downlink data, a payload size of the PUCCH is one or two bits, and if the second downlink component carrier is used for receiving the downlink data, the payload size of the PUCCH is more than two bits.

5. The method of claim 1, wherein the downlink data is received on a physical downlink shared channel (PDSCH).

6. A user equipment configuring an acknowledgement for a hybrid automatic repeat request (HARQ) in a wireless communication system, comprising:
   a radio frequency (RF) unit; and
   a processor coupled to the RF unit and configured to:
   receive downlink data through one of a first downlink component carrier and a second downlink component carrier from a base station,
   determine whether the first downlink component carrier or the second downlink component carrier is used for receiving the downlink data,
   determine a resource used for a physical uplink control channel (PUCCH) to transmit an ACK/NACK signal for the downlink data in accordance with the determination,
   wherein if the first downlink component carrier is used for receiving the downlink data, the resource used for the PUCCH is determined by using a control channel element (CCE) of a physical downlink control channel (PDCCH) associated with the downlink data,
   wherein if the second downlink component carrier is used for receiving the downlink data, the resource used for the PUCCH is determined by using a radio resource control (RRC) message, and
   wherein the resource used for the PUCCH is associated with an orthogonal sequence with which the ACK/NACK signal is spread.

7. The user equipment of claim 6, wherein the first downlink component carrier is a primary component carrier, and the second component carrier is a secondary component carrier.

8. The user equipment of claim 6, wherein a radio resource allocated for the downlink data is indicated by downlink control information (DCI) and received through the PDCCH.

9. The user equipment of claim 6, wherein if the first downlink component carrier is used for receiving the downlink data, a payload size of the PUCCH is one or two bits, and if the second downlink component carrier is used for receiving the downlink data, the payload size of the PUCCH is more than two bits.

10. The user equipment of claim 6, wherein the downlink data is received on a physical downlink shared channel (PDSCH).

* * * * *